(12) United States Patent  
Borovytsky

(10) Patent No.: US 9,019,422 B2  
(45) Date of Patent: Apr. 28, 2015

(54) DEGREE-OF-FOCUS DETERMINATION MODULE, POSITION-OF-BEST-FOCUS SELECTION MODULES, IMAGE PROCESSING MODULE, IMAGING SYSTEM, AND CORRESPONDING METHOD

(75) Inventor: Volodymyr Borovytsky, Kyiv (UA)

(73) Assignee: Freescale Semiconductor, Inc., Austin, TX (US)

( * ) Notice: Subject to any disclaimer, the term of this patent is extended or adjusted under 35 U.S.C. 154(b) by 349 days.

(21) Appl. No.: 13/378,230

(22) PCT Filed: Jul. 8, 2009

(86) PCT No.: PCT/UA2009/000030
§ 371 (c)(1),
(2), (4) Date: Dec. 14, 2011

(87) PCT Pub. No.: WO2011/005238
PCT Pub. Date: Jan. 13, 2011

(65) Prior Publication Data
US 2012/0092546 A1    Apr. 19, 2012

(51) Int. Cl.
| | |
|---|---|
| *H04N 5/232* | (2006.01) |
| *G03B 13/00* | (2006.01) |
| *G02B 21/24* | (2006.01) |
| *G02B 21/36* | (2006.01) |

(52) U.S. Cl.
CPC ............ *G02B 21/244* (2013.01); *G02B 21/367* (2013.01)

(58) Field of Classification Search
CPC . H04N 5/23212; H04N 5/23293; H04N 7/18; H04N 7/183; H05K 13/08

USPC .............. 348/86, 87, 92, 125, 126, 128, 131, 348/133, 135, 345; 356/630
See application file for complete search history.

(56) References Cited

U.S. PATENT DOCUMENTS

| | | | |
|---|---|---|---|
| 5,040,228 A | * | 8/1991 | Bose et al. .................... 382/141 |
| 5,235,375 A | | 8/1993 | Yamana et al. |
| 5,790,710 A | | 8/1998 | Price et al. |
| 6,151,415 A | | 11/2000 | Acharya et al. |
| 6,201,899 B1 | | 3/2001 | Bergen |

(Continued)

FOREIGN PATENT DOCUMENTS

| | | | | |
|---|---|---|---|---|
| WO | | 00/75709 A1 | 12/2000 | |
| WO | WO 00/75709 A1 | * | 12/2000 | ............. G02B 21/24 |

OTHER PUBLICATIONS

Boddeke, Frank R et al: "Autofocusing in Microscopy Based on the OTF and Sampling" Bioimaging 2, IOP Publishing LTD, 1994, pp. 193-203.

(Continued)

*Primary Examiner* — Lin Ye
*Assistant Examiner* — Chriss Yoder, III

(57) ABSTRACT

A system for imaging a structure of an object is provided. The imaging system includes a degree-of-focus determination module that may comprise logic for taking into account at least one of a first and a second dimension of a topological element of the structure to be imaged. An image processing module of the system may comprise: a control module for controlling a motorized focus driver; a memory for storing images; and said degree-of-focus determination module. The imaging system may comprise: a stage; a motorized focus driver for driving the stage; at least one of microscope optics, a lens, an illumination system; a camera; and an image processing module.

18 Claims, 8 Drawing Sheets

(56) References Cited

U.S. PATENT DOCUMENTS

| | | | |
|---|---|---|---|
| 6,341,180 B1 | 1/2002 | Petterson et al. | |
| 6,806,970 B2 * | 10/2004 | Hirose et al. | 356/630 |
| 6,970,789 B2 * | 11/2005 | Ippolito et al. | 702/21 |
| 7,109,459 B2 * | 9/2006 | Kam et al. | 250/201.4 |
| 7,141,773 B2 | 11/2006 | Kaplan et al. | |
| 8,111,938 B2 * | 2/2012 | Bryll et al. | 382/255 |
| 2002/0044346 A1 | 4/2002 | Nguyen et al. | |

OTHER PUBLICATIONS

International Search Report and Written Opinion correlating to PCT/UA2009/000030 dated Apr. 7, 2010.

* cited by examiner

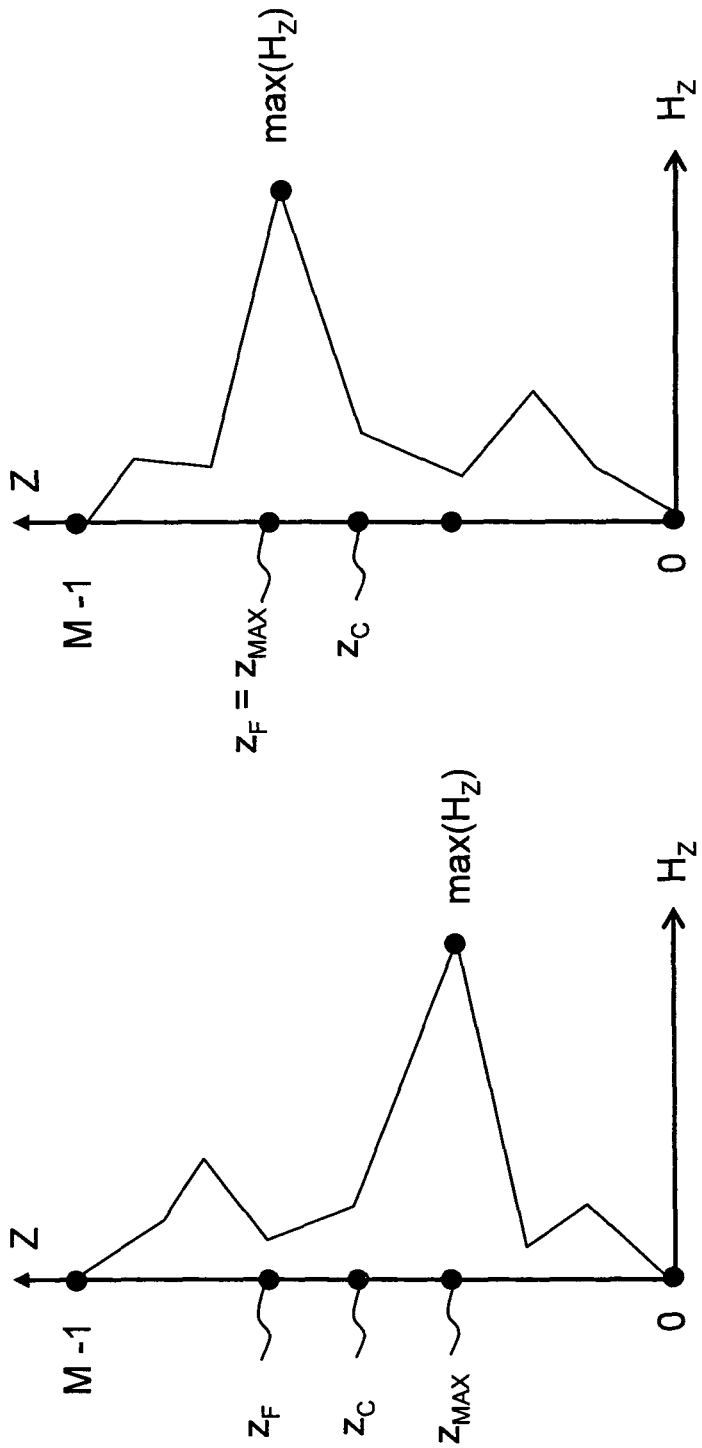

DEGREE-OF-FOCUS DETERMINATION MODULE, POSITION-OF-BEST-FOCUS SELECTION MODULES, IMAGE PROCESSING MODULE, IMAGING SYSTEM, AND CORRESPONDING METHOD

FIELD OF THE INVENTION

This invention in general relates to a degree-of-focus determination module. Further, this invention in general relates to position-of-best-focus selection modules. Further, this invention in general relates to an image processing module. Further, this invention in general relates to an imaging system. Moreover, this invention in general relates to a corresponding method for image processing.

BACKGROUND OF THE INVENTION

Reliable focusing algorithms are needed for deep ultra-violet, ultra-violet, visible, and infrared inspection platforms and for digital microscopes, e.g. for such devices as used in the semiconductor industry, material, medical, and biological production and science.

SUMMARY OF THE INVENTION

The present invention provides a degree-of-focus determination module, position-of-best-focus selection modules, an image processing module, an imaging system, and a method as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

FIG. 7 shows schematically a histogram of an example of degree-of-focus determination according to an embodiment, wherein an upper layer contains a small number of topological elements, and wherein the histogram is imaged as function of an image number in an image stack.

FIG. 8 shows schematically a histogram of an example of degree-of-focus determination according to an embodiment, wherein an upper layer contains a higher number of topological elements than the lower one, and wherein the histogram is imaged as function of an image number in an image stack.

DETAILED DESCRIPTION

Figure 1:
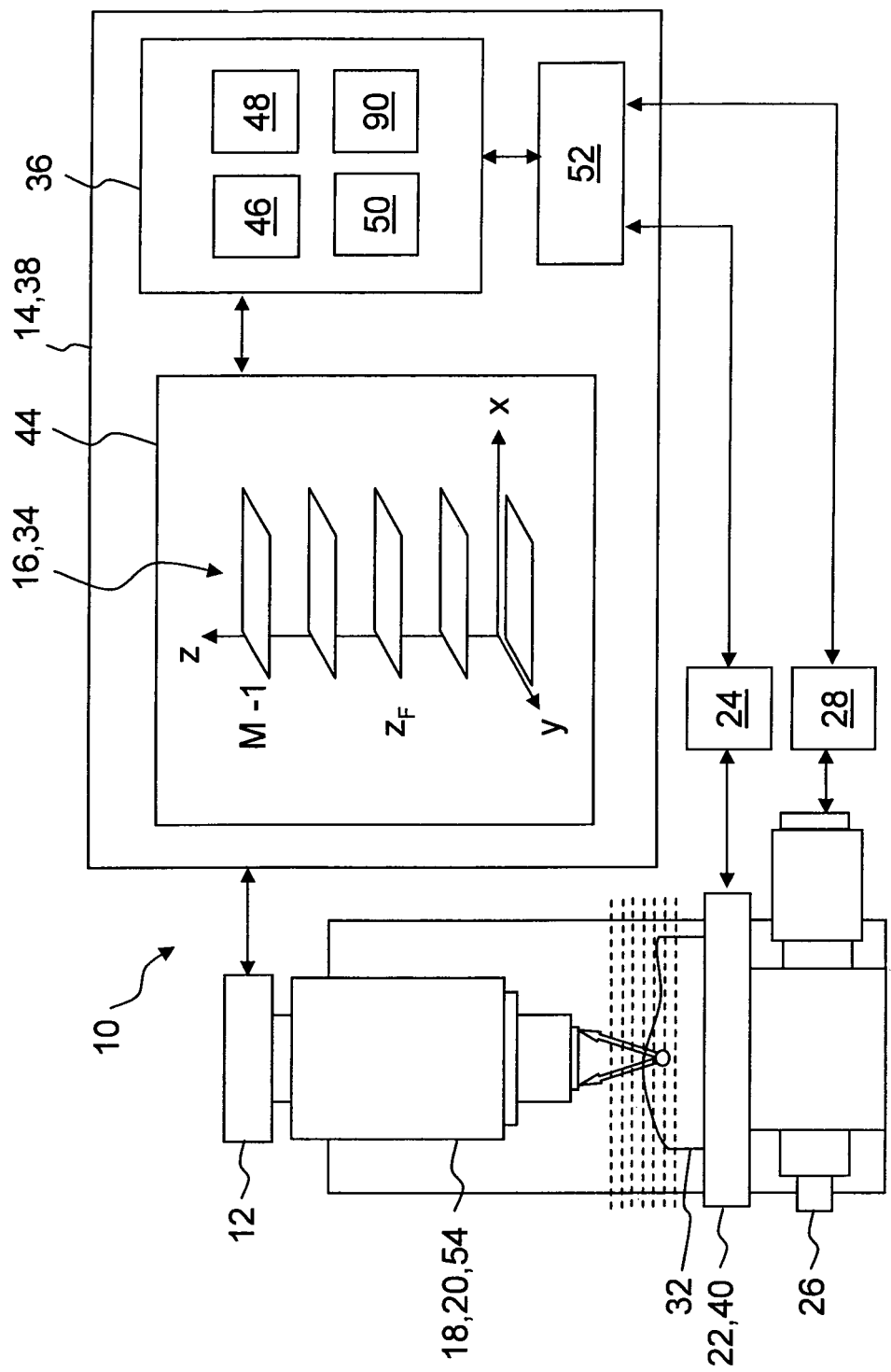
FIG. 1 shows schematically an arrangement of an example of an embodiment of an imaging system.

Referring to FIG. 1, a schematic example of an embodiment of an imaging system 10 is shown. In the example, the imaging system 10 is arranged as an optical microscope 18. The microscope 18 comprises a digital camera 12 and an image processing module 14 for processing a set 34 of electronic intermediate images 16 captured from the camera 12, an optics 54 (e.g. a microscope optics) having an illumination system 20, motorized stages 22 together with a controller 24 of the motorized stages 22, and a motorized focus driver 26 with a controller 28 of the motorized focus driver 26. The set of electronic intermediate images 16 taken of a same structure 30 by focusing at different focus levels z=0 to z=M−1 of the structure 30 of an object 32 (e.g. of a specimen) to be imaged may be called image stack 34. The image stack 34 may include images of an upper layer 66, of intermediate layers 62, and of a lower layer 64 (see FIG. 2). The image processing module 14 may be realized with image processing software 36 running on a computer 38. For taking images 16 of the structure 30 of the object 32, the object 32 may be mounted in a specimen holder 40 on one of the motorized stages 22. Based on the image stack 34 a digital map of a multi-layer structure 30 can be built. The image processing module 14 may comprise at least one of the modules of a memory 44 for storing the image stack 34, of a module 46 for image processing, a degree-of-focus determination module 90, a position-of-best-focus selection module 48, a focus extension module 50, a scanning control module 52 for sending commands to the controller 28 of the motorized focus driver 26 and to the controller 24 of the motorized stages 22. The scanning control module 52 may control a scanning process of an object surface for building digital maps of this surface. The imaging system 10 may comprise a motorized stage 22, a motorized focus driver 26 for driving the stage 22, at least one of microscope optics 54, an illumination unit 22, a camera 12, and an image processing module 42. The microscope optics 54 may be capable of forming an image of the structure 30 of the object 32 in an image plane, where an image sensor of a camera 12 is located. The imaging system 10 comprises an illumination system 20 for illumination of the structure 30 to be imaged. The illumination system 20 may be capable of irradiating the structure 30 to be imaged.

Figure 2:
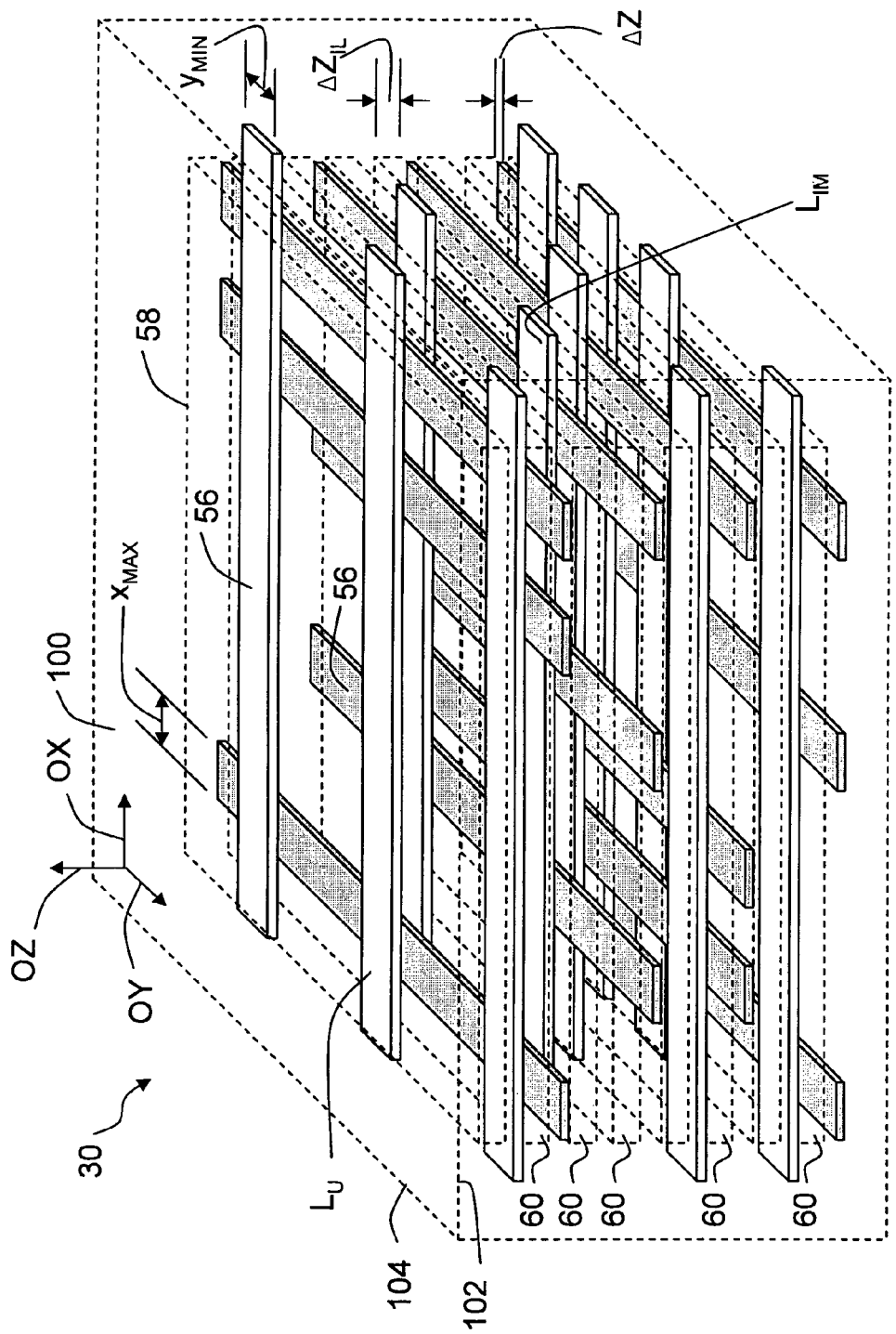
FIG. 2 shows schematically a structure of an example of an object to be imaged.

FIG. 2 shows schematically an example of a structure 30 of an object 32 to be imaged. A third dimension $\Delta Z$ of a topological element 56 of the structure 30 to be imaged may be one of a thickness $\Delta ZL$ of a layer z, of a thickness $\Delta ZIL$ of an interlayer 60, and a sum of the thicknesses $\Delta ZL + \Delta ZIL$ of the layer z and an interlayer 60 adjacent thereto.

Figure 3:
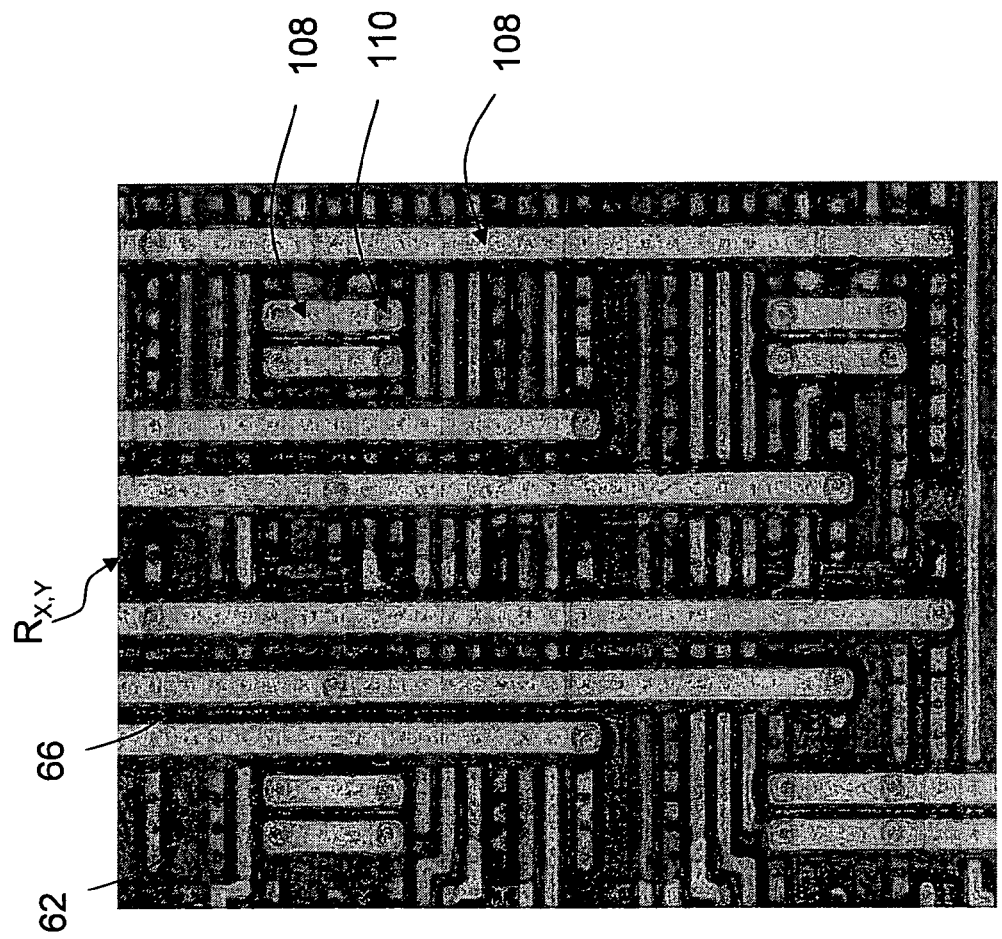
FIG. 3 shows an example of an image with digital focus extension taken with widely used spatial filters employing no adaptation of the digital focus extension to die features.

FIG. 3 shows an example of an image with digital focus extension of a structure 30 taken with widely used spatial filters employing no adaptation of the digital focus extension to any die feature, like $x_{MIN}$, $y_{MIN}$, $\Delta Z$, or $\Delta ZIL$. In this case, an image of an intermediate layer $L_{IM}$ 62 located under an upper layer $L_U$ 66 may have such a good contrast that the image processing module 46 cannot distinguish an upper layer $L_U$ from the intermediate layer $L_{IM}$ delivering the good contrast.

Figure 4:
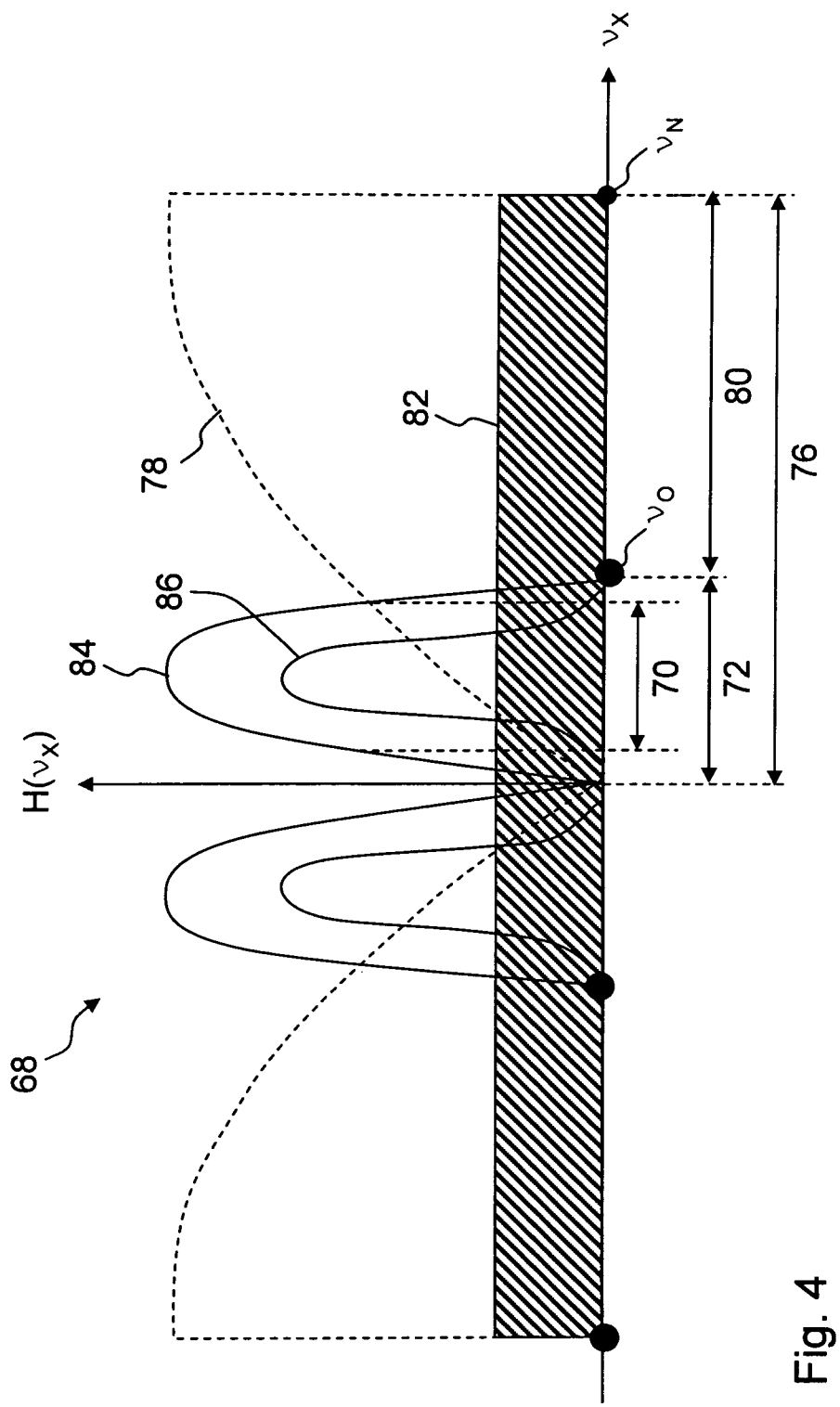
FIG. 4 shows schematically an example of a spatial spectrum diagram showing an arrangement of spatial bandwidth for degree-of-focus determination in relation to a spatial bandwidth of microscope optics and a digital camera.

FIG. 4 schematically shows an example of an arrangement of a spatial bandwidth 70 for degree-of-focus determination in relation to a spatial bandwidth 72 of microscope optics 54.

The microscope optics 54 may deliver useful information only in a limited spatial frequency range 72. Also, information delivered by the camera 12 may be spatially bandwidth-limited. The spatial bandwidth limitation 76 of the camera 12 results from a limited resolution of an image sensor of the camera 12 (i.e. it is determined by the spatial period of photosensitive cells of the image sensor of the camera 12). When a ratio between the spatial bandwidth of the camera 12 defined by Nyquist frequencies and the spatial bandwidth of the optics 54 is greater than one, a void (non-effective) magnification may take place. In the example of FIG. 3, the void (non-effective) magnification is greater than two. Conventional focusing algorithms may take into account spatial frequencies 80 outside the spatial bandwidth 72 of the optics 54 and which contain noise 82 only. The focusing algorithm of the present invention may employ a spatial spectrum 84 lying within the spatial bandwidth 72 of the optics 54. The focusing algorithm may employ a spatial spectrum 86 that fits to, or is at least part of a spatial spectrum 86 of images 30 of topological elements 56 with dimensions $x_{MIN}$, $y_{MIN}$, $\Delta Z$, or $\Delta ZIL$. These portions of spatial spectrum 86 can lie within the spatial bandwidth 84 of the optics 54.

The degree-of-focus determination module 90 may comprise logic for taking into account at least one of a first $x_{MIN}$ and a second $y_{MIN}$ dimension of a topological element 56 of the structure 30 to be imaged (see FIG. 2). The degree-of-focus determination module 90 may comprise a filter having a first filter parameter $M_X$ adapted to a first dimension $x_{MIN}$ of the topological element 56 of the structure 30 to be imaged. The degree-of-focus determination module 90 may comprise a filter having a second filter parameter $M_Y$ adapted to a second dimension $y_{MIN}$ of the topological element 56 of the structure 30 to be imaged. A first direction OX of the first dimension $x_{MIN}$ and a second direction OY of the second dimension $y_{MIN}$ may be substantially perpendicular to each other. The image plane 100 of the structure 30 may have the direction OX of the first dimension $x_{MIN}$ of the topological element 56 that is perpendicular to a perpendicular 104 on one of the large sides 102 (see FIG. 2).

Figure 5:
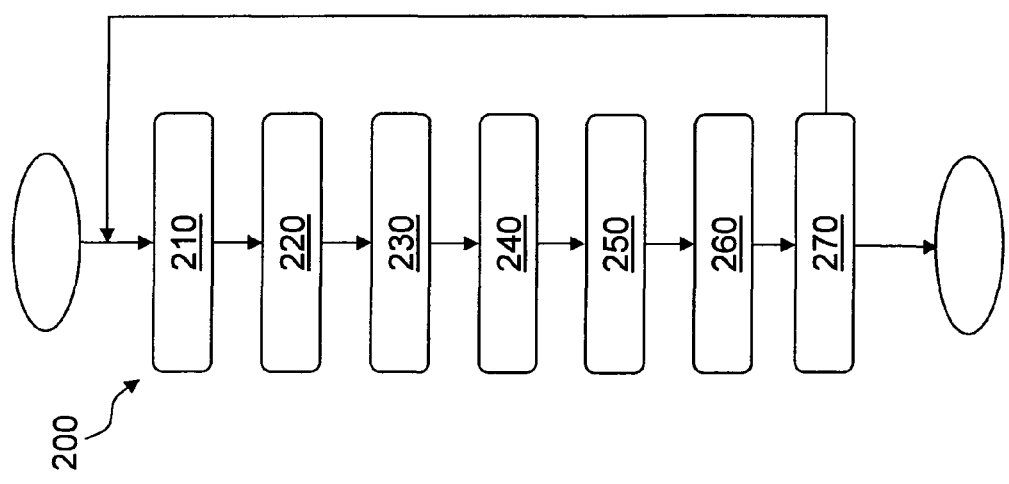
FIG. 5 shows schematically a flow diagram of an example of an embodiment of a method for image processing.

FIG. 5 shows schematically a flow diagram of an example of an embodiment of a method 200 for processing an image stack 34 of a structure 30 of an object 32, wherein the structure 30 comprises a plurality of buses (108) or vias (110), wherein the buses (108) respectively vias (110) may have at least one prevailing orientation OX, wherein the structure 30 to be imaged may be positioned such that the prevailing orientation OX is oriented perpendicular to a scanning direction OY.

In a first method step 210, the imaging system 10 can produce the image stack 34, for example using optics 54 and a camera 12. The image stack 34 contains a set of images $S_Z$ which may be made with different coordinates z along an optical axis OZ (see FIG. 1). An area for degree-of-focus determination may be selected as one of: the whole image $S_z$, a zone having a highest contrast and dimensions defined by a user, a central zone having the dimensions defined by the user, and several zones with locations and dimensions defined by the user. In the area for degree-of-focus determination in each image $S_z$, the degree-of-focus $U_z$ can be calculated for all pixels $s_{z,y,z}$ or a number of pixels $s_{x,y,z}$ defined by the user.

In a second method step 220, each image $S_z$ of the image stack 34 may be pre-processed for distortion compensation.

Figure 6:
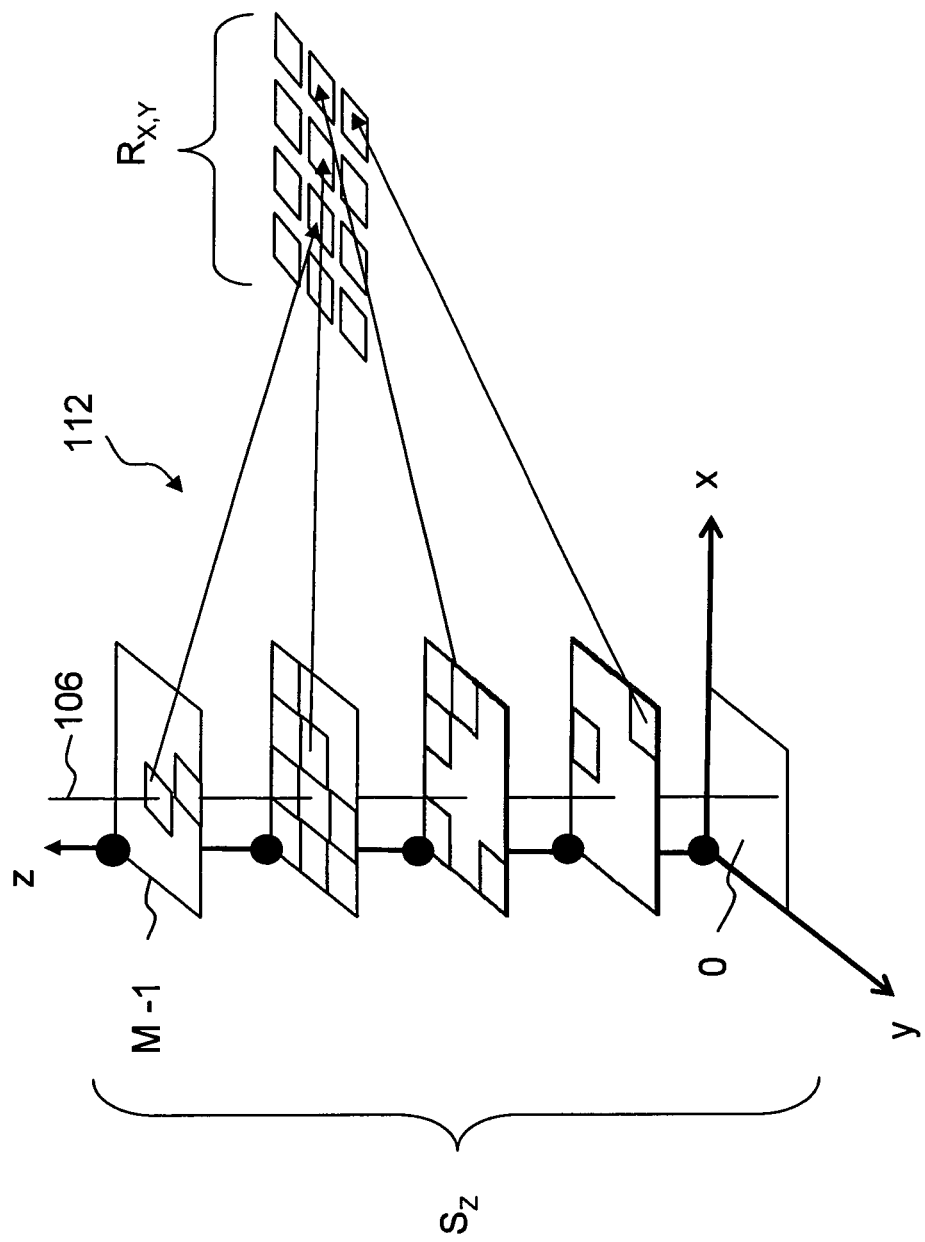
FIG. 6 shows schematically a concept of an example of an embodiment of an image assembling method for composing an image with digital focus extension.

In a third method step 230, for determination of a degree-of-focus $U_z$ for each pixel $s_{x,y,z}$ in each image $S_z$ of the image stack 34 may be filtered using a linear or non-linear digital filter. A filter matrix $w_{i,j}$ may be calculated using information about at least one of a spatial bandwidth 72 of the microscope optics 54, of a spatial bandwidth of the camera 12 which may be limited by Nyquist frequencies, and of typical dimensions $x_{MIN}$, $y_{MIN}$ of topological elements 56 of a structure 30 of the object 32 to be imaged. One or more zones of focus identification can be selected automatically as zones of definite size with highest contrast or pointed manually. The following formulas may be used for calculation of the degree-of-focus using linear or non-linear filtering:

The first formula may describe linear filtering using a symmetrical filter coefficient matrix:

$$u_{x,y,z} = k_u \cdot \sum_{i=-K_X}^{M_X} \sum_{j=-K_Y}^{M_Y} (s_{x-i, y-j, z} \cdot w_{i,j})$$

wherein x, y, z are pixel coordinates along the axes OX, OY and OZ in the zone for degree-of-focus determination, respectively (see FIG. 6); $M_X$, $K_X$, $M_Y$, $K_Y$ are numbers that define a size of a filter coefficient matrix with dimensions, when this matrix is symmetrical then $M_X = K_X$, $M_Y = K_Y$; $u_{x,y,z}$ is the processed image stack 34 after linear filtering; $k_U$ is a normalization coefficient; $s_{x,y,z}$ is the image stack 34 as a three dimensional array of amplitudes for gray-scale images or amplitudes of the definite color channel; $u_{x,y,z}$ is a processed image stack that contains degree-of-focus measures for each pixel of image information of the image stack 34; $w_{i,j}$ is a filter coefficient matrix with dimensions $(M_X+1+K_X) \times (M_Y+1+K_Y)$; in case of dimensions 9×9 this matrix is the following:

$$w_{i,j} = \begin{vmatrix} -1 & 0 & 0 & 0 & -1 & 0 & 0 & 0 & -1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ -1 & 0 & 0 & 0 & 8 & 0 & 0 & 0 & -1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ -1 & 0 & 0 & 0 & -1 & 0 & 0 & 0 & -1 \end{vmatrix} \text{ or}$$

$$w_{i,j} = \begin{vmatrix} 0 & 0 & 0 & 0 & -1 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ -1 & 0 & 0 & 0 & 4 & 0 & 0 & 0 & -1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & -1 & 0 & 0 & 0 & 0 \end{vmatrix} \text{ or}$$

$$w_{i,j} = \begin{vmatrix} -1 & -1 & -1 & -1 & -1 & -1 & -1 & -1 & -1 \\ -1 & -1 & -1 & -1 & -1 & -1 & -1 & -1 & -1 \\ -1 & -1 & -1 & -1 & -1 & -1 & -1 & -1 & -1 \\ -1 & -1 & -1 & 8 & 8 & 8 & -1 & -1 & -1 \\ -1 & -1 & -1 & 8 & 8 & 8 & -1 & -1 & -1 \\ -1 & -1 & -1 & 8 & 8 & 8 & -1 & -1 & -1 \\ -1 & -1 & -1 & -1 & -1 & -1 & -1 & -1 & -1 \\ -1 & -1 & -1 & -1 & -1 & -1 & -1 & -1 & -1 \\ -1 & -1 & -1 & -1 & -1 & -1 & -1 & -1 & -1 \end{vmatrix} \text{ or}$$

$$w_{ij} = \begin{vmatrix} 0 & 0 & 0 & -1 & -1 & -1 & 0 & 0 & 0 \\ 0 & 0 & 0 & -1 & -1 & -1 & 0 & 0 & 0 \\ 0 & 0 & 0 & -1 & -1 & -1 & 0 & 0 & 0 \\ -1 & -1 & -1 & 4 & 4 & 4 & -1 & -1 & -1 \\ -1 & -1 & -1 & 4 & 4 & 4 & -1 & -1 & -1 \\ -1 & -1 & -1 & 4 & 4 & 4 & -1 & -1 & -1 \\ 0 & 0 & 0 & -1 & -1 & -1 & 0 & 0 & 0 \\ 0 & 0 & 0 & -1 & -1 & -1 & 0 & 0 & 0 \\ 0 & 0 & 0 & -1 & -1 & -1 & 0 & 0 & 0 \end{vmatrix}$$

The second formulas may describe linear filtering using a directional filter coefficient matrix:

$$u_{x,y,z} = k_u \cdot \left( \left( \sum_{i=-K_X}^{M_X} \sum_{j=-K_Y}^{M_Y} (s_{x-i,y-j,z} \cdot h_{i,j}) \right)^2 + \left( \sum_{i=-K_X}^{M_X} \sum_{j=-K_Y}^{M_Y} (s_{x-i,y-j,z} \cdot v_{i,j}) \right)^2 \right)$$

or $$u_{x,y,z} = k_u \cdot \sqrt{ \left( \sum_{i=-K_X}^{M_X} \sum_{j=-K_Y}^{M_Y} (s_{x-i,y-j,z} \cdot h_{i,j}) \right)^2 + \left( \sum_{i=-K_X}^{M_X} \sum_{j=-K_Y}^{M_Y} (s_{x-i,y-j,z} \cdot v_{i,j}) \right)^2 }$$

or $$u_{x,y,z} = k_u \cdot \left( \left( \sum_{i=-K_X}^{M_X} \sum_{j=-K_Y}^{M_Y} (s_{x-i,y-j,z} \cdot h_{i,j}) \right) + \left( \sum_{i=-K_X}^{M_X} \sum_{j=-K_Y}^{M_Y} (s_{x-i,y-j,z} \cdot v_{i,j}) \right) \right)$$

where $M_X$, $K_X$, $M_Y$ and $K_Y$ are numbers that define a size of a filter coefficient matrix; $h_{i,j}$, $v_{i,j}$ are filter coefficient matrices for direction along axis OX with dimensions $((M_X+1+K_X) \times (M_Y+1+K_Y))$, and along axes OX and OY, respectively; in case of dimensions 9×9 these matrixes are the following:

$$h_{i,j} = \begin{vmatrix} -1 & 0 & 0 & 0 & 0 & 0 & 0 & 0 & 1 \\ -1 & 0 & 0 & 0 & 0 & 0 & 0 & 0 & 1 \\ -1 & 0 & 0 & 0 & 0 & 0 & 0 & 0 & 1 \\ -1 & 0 & 0 & 0 & 0 & 0 & 0 & 0 & 1 \\ -1 & 0 & 0 & 0 & 0 & 0 & 0 & 0 & 1 \\ -1 & 0 & 0 & 0 & 0 & 0 & 0 & 0 & 1 \\ -1 & 0 & 0 & 0 & 0 & 0 & 0 & 0 & 1 \\ -1 & 0 & 0 & 0 & 0 & 0 & 0 & 0 & 1 \\ -1 & 0 & 0 & 0 & 0 & 0 & 0 & 0 & 1 \end{vmatrix} \text{ or}$$

$$h_{i,j} = \begin{vmatrix} -1 & -1 & -1 & 0 & 0 & 0 & 1 & 1 & 1 \\ -1 & -1 & -1 & 0 & 0 & 0 & 1 & 1 & 1 \\ -1 & -1 & -1 & 0 & 0 & 0 & 1 & 1 & 1 \\ -1 & -1 & -1 & 0 & 0 & 0 & 1 & 1 & 1 \\ -1 & -1 & -1 & 0 & 0 & 0 & 1 & 1 & 1 \\ -1 & -1 & -1 & 0 & 0 & 0 & 1 & 1 & 1 \\ -1 & -1 & -1 & 0 & 0 & 0 & 1 & 1 & 1 \\ -1 & -1 & -1 & 0 & 0 & 0 & 1 & 1 & 1 \\ -1 & -1 & -1 & 0 & 0 & 0 & 1 & 1 & 1 \end{vmatrix} \text{ or}$$

$$h_{i,j} = \begin{vmatrix} -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \end{vmatrix} \text{ or}$$

$$h_{i,j} = \begin{vmatrix} -1 & -1 & -1 & -1 & 1 & 1 & 1 & 1 & 0 \\ -1 & -1 & -1 & -1 & 1 & 1 & 1 & 1 & 0 \\ -1 & -1 & -1 & -1 & 1 & 1 & 1 & 1 & 0 \\ -1 & -1 & -1 & -1 & 1 & 1 & 1 & 1 & 0 \\ -1 & -1 & -1 & -1 & 1 & 1 & 1 & 1 & 0 \\ -1 & -1 & -1 & -1 & 1 & 1 & 1 & 1 & 0 \\ -1 & -1 & -1 & -1 & 1 & 1 & 1 & 1 & 0 \\ -1 & -1 & -1 & -1 & 1 & 1 & 1 & 1 & 0 \\ -1 & -1 & -1 & -1 & 1 & 1 & 1 & 1 & 0 \end{vmatrix}$$

$$w_{i,j} = \begin{vmatrix} -1 & -1 & -1 & -1 & -1 & -1 & -1 & -1 & -1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 1 & 1 & 1 & 1 & 1 & 1 & 1 & 1 & 1 \end{vmatrix} \text{ or}$$

$$w_{i,j} = \begin{vmatrix} -1 & -1 & -1 & -1 & -1 & -1 & -1 & -1 & -1 \\ -1 & -1 & -1 & -1 & -1 & -1 & -1 & -1 & -1 \\ -1 & -1 & -1 & -1 & -1 & -1 & -1 & -1 & -1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \end{vmatrix} \text{ or}$$

$$w_{i,j} = \begin{vmatrix} -1 & -1 & -1 & -1 & -1 & -1 & -1 & -1 & -1 \\ -1 & -1 & -1 & -1 & -1 & -1 & -1 & -1 & -1 \\ -1 & -1 & -1 & -1 & -1 & -1 & -1 & -1 & -1 \\ -1 & -1 & -1 & -1 & -1 & -1 & -1 & -1 & -1 \\ 0 & 0 & 0 & 0 & 0 & 0 & 0 & 0 & 0 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \end{vmatrix} \text{ or}$$

$$w_{i,j} = \begin{vmatrix} -1 & -1 & -1 & -1 & -1 & -1 & -1 & -1 & -1 \\ -1 & -1 & -1 & -1 & -1 & -1 & -1 & -1 & -1 \\ -1 & -1 & -1 & -1 & -1 & -1 & -1 & -1 & -1 \\ -1 & -1 & -1 & -1 & -1 & -1 & -1 & -1 & -1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 0 & 0 & 0 & 0 & 0 & 0 & 0 & 0 & 0 \end{vmatrix}$$

The third formula may describe a non-linear filtering using a symmetrical filter coefficient matrix:

$$u_{x,y,z} = k_u \cdot \sum_{i=-K_X}^{M_X} \sum_{j=-K_Y}^{M_Y} (s_{x-i,y-j,z} \cdot g_{i,j} - \bar{s}_z)^2$$

with $$\bar{s}_z = \frac{\sum_{i=-K_X}^{M_X} \sum_{j=-K_Y}^{M_Y} (s_{x-i,y-j,z} \cdot g_{i,j})}{\sum_{i=-K_X}^{M_X} \sum_{j=-K_Y}^{M_Y} g_{i,j}}$$

where $M_X$, $K_X$, $M_Y$ and $K_Y$ are numbers that define a size of the filter coefficient matrix; $u_{x,y,z}$ is a processed image stack that contains, degree-of-focus measures after non-linear filtering; $s_Z$ is the weighted average value of input image $U_z$; and $g_{i,j}$ is a filter coefficient matrix; in case of dimensions 9×9 this matrix is the following:

$$g_{i,j} = \begin{vmatrix} 1 & 0 & 0 & 0 & 1 & 0 & 0 & 0 & 1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 1 & 0 & 0 & 0 & 1 & 0 & 0 & 0 & 1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 1 & 0 & 0 & 0 & 1 & 0 & 0 & 0 & 1 \end{vmatrix} \text{ or}$$

$$g_{i,j} = \begin{vmatrix} 0 & 0 & 0 & 0 & 1 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 1 & 0 & 0 & 0 & 1 & 0 & 0 & 0 & 1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 1 & 0 & 0 & 0 & 0 \end{vmatrix} \text{ or}$$

$$g_{i,j} = \begin{vmatrix} 1 & 1 & 1 & 0 & 0 & 0 & 1 & 1 & 1 \\ 1 & 1 & 1 & 0 & 0 & 0 & 1 & 1 & 1 \\ 1 & 1 & 1 & 0 & 0 & 0 & 1 & 1 & 1 \\ 0 & 0 & 0 & 1 & 1 & 1 & 0 & 0 & 0 \\ 0 & 0 & 0 & 1 & 1 & 1 & 0 & 0 & 0 \\ 0 & 0 & 0 & 1 & 1 & 1 & 0 & 0 & 0 \\ 1 & 1 & 1 & 0 & 0 & 0 & 1 & 1 & 1 \\ 1 & 1 & 1 & 0 & 0 & 0 & 1 & 1 & 1 \\ 1 & 1 & 1 & 0 & 0 & 0 & 1 & 1 & 1 \end{vmatrix} \text{ or}$$

$$g_{i,j} = \begin{vmatrix} 0 & 0 & 0 & 1 & 1 & 1 & 0 & 0 & 0 \\ 0 & 0 & 0 & 1 & 1 & 1 & 0 & 0 & 0 \\ 0 & 0 & 0 & 1 & 1 & 1 & 0 & 0 & 0 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 0 & 0 & 0 & 1 & 1 & 1 & 0 & 0 & 0 \\ 0 & 0 & 0 & 1 & 1 & 1 & 0 & 0 & 0 \\ 0 & 0 & 0 & 1 & 1 & 1 & 0 & 0 & 0 \end{vmatrix} \text{ or}$$

$$g_{i,j} = \begin{vmatrix} 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 0 & 0 & 0 & 1 & 1 & 1 \\ 1 & 1 & 1 & 0 & 0 & 0 & 1 & 1 & 1 \\ 1 & 1 & 1 & 0 & 0 & 0 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \end{vmatrix} \text{ or}$$

$$g_{i,j} = \begin{vmatrix} 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \end{vmatrix}$$

The dimensions of the filter coefficient matrix can be calculated using parameters of the optics 54, the camera 12, and the dimensions of the topological elements 56 (See FIG. 2, 3), in order to ensure that degree-of-focus determination uses spatial harmonics in the spatial bandwidths 72 of the microscope optics 54 and that the spatial filter corresponds to the dimensions of the topological elements 56. The dimensions of the filter coefficient matrix are $W_X \times W_X = (M_X+1+K_X) \times (M_Y+1+K_Y)$; $W_X$ and $W_Y$ in $[N_{MIN} \ldots N_{MAX}]$ and they may be in the following range $N_{MIN} \ldots N_{MAX}$:

$$N_{MIN} = \text{int}\left(\frac{\upsilon_N}{\upsilon_O}\right)$$

$$= \text{int}(d_O \cdot \upsilon_N)$$

$$= \text{int}\left(\left(\frac{\lambda}{2 \cdot NA}\right) \cdot \frac{1}{2 \cdot \left(\frac{\Delta x}{\beta}\right)}\right)$$

$$= \text{int}\left(\frac{\lambda \cdot \beta}{4 \cdot NA \cdot \Delta x}\right)$$

$$N_{MAX} = \text{int}((d_O + k_F \cdot x_{MIN}) \cdot \upsilon_N)$$

$$= \text{int}(d_O \cdot \upsilon_N + k_F \cdot x_{MIN} \cdot \upsilon_N)$$

$$= \text{int}\left(\frac{\lambda}{2 \cdot NA} \cdot \frac{1}{2 \cdot \left(\frac{\Delta x}{\beta}\right)} + k_F \cdot x_{MIN} \cdot \frac{1}{2 \cdot \left(\frac{\Delta x}{\beta}\right)}\right)$$

$$\approx N_{MIN} + \text{int}\left(k_F \cdot \frac{x_{MIN} \cdot \beta}{2 \cdot \Delta x}\right)$$

where $\lambda$ is the principal wavelength; $\beta$, NA are the linear magnification and the numerical aperture of microscope optics 54, respectively; $\Delta x$ is the spatial period of photosensitive cells with equal optical properties in an image sensor of a camera 12; int( ) is a function that calculates the integer part of the real argument; and $x_{MIN}$ is the minimal dimension of topological elements 56 in the field of view of the imaging system 10; $\upsilon_O$, $\upsilon_N$ are the spatial bandwidth of microscope optics 54 and the spatial bandwidth of camera 12 equal to Nyquist frequency, respectively; $d_O$ is minimal resolved spatial period of microscope optics 54 defined by Abbe formula and equal to $1/\upsilon_O$; $k_F$ is a coefficient in range from 0.5 to 2.5.

In the area of degree-of-focus determination, a degree-of-focus histogram $H_z$ can be calculated using a degree-of-focus measure $u_{x,y,z}$ of each of the pixels $s_{x,y,z}$ (see FIG. 7, 8). The histogram $H_z$ defines the number of pixels $s_{x,y,z}$ with highest degree-of-focus for each image $S_z$ in the image stack 34:

$$H_z = \sum_{i=0}^{N_X} \sum_{j=0}^{N_Y} \begin{cases} 1, & u_{x,y,z} = \max_{z \in [0, M-1]}(u_{x,y,z}) \\ 0, & \text{otherwise} \end{cases}$$

where $N_X$, $N_Y$ is the dimension of an image $S_z$ or its zone in the image stack 34; and $H_Z$ is the degree-of-focus histogram as function of an image number in the image stack 34.

In a step 240 the extraction of these pixels $u_{x,y}$ from the image stack 34 allows assembling the image $U_{ZF}$ or the image fragment(s) with digitally extended focus (see FIG. 6):

$$R_{x,y} = s_{x,y,z} : u_{x,y,z} \xrightarrow{z} \max \big|_{x \in [0, N_X-1], y \in [0, N_Y-1]}$$

where $R_{X,Y}$ is the image or image fragment(s) with digital focus extension; z is a coordinate in image stack 34 with maximal degree-of-focus measure $u_{X,Y,Z}$ for pixel with coordinates x, y.

This part of method step 240 is illustrated in FIG. 6, which shows schematically a concept of an image assembling method 112 for composing an image $R_{X,Y}$ with focus extension. For each two-dimensional pixel position x, y there can be one value $s_{x,y,z}$ in each image $S_z$ of the image stack 34. For each two-dimensional pixel position x, y there may be a "pixel stack" 106. The image assembling method (algorithm) 112 can extract for each two-dimensional pixel position x, y the best-focused pixel $s_{x,y,z}$ to form from pixels $R_{X,Y}$ a synthetic image $U_{ZF}$ having a digital focus extension.

Continuing with FIG. 5, in a fourth method step 250 a position $z_F$ of best-focused image in the image stack 34 can be calculated based on e.g. a focus evaluation function $z_F = f(z_C, z_{MAX})$ (see FIG. 7, 8). The focus evaluation may be based on a number of values $u_{x,y,z}$ with highest degree-of-focus in each degree-of-focus measure $U_z$. The structure 30 to be imaged may be a multi-layer structure 30, in which case a degree-of-focus histogram $H_z$ may have several peaks (see FIG. 7, 8). When the position $Z_{MAX}$ of global maximum is higher than the geometrical centre $z_c$ of the image stack 34, the image processing module 14 can select the position $Z_{MAX}$ of the global maximum as the position $z_F$ of best focus. Otherwise, the system can select the position $z_F$ of best focus in a zone higher than the position $z_C$ of the geometrical centre. This may guarantee that the best-focused image can be selected close to the upper layer $L_U$ and it may enable the imaging system 10 to build the digital map of the object surface 32 even when the object contains several semi-transparent layers. The following formula allows calculating the best focus position $z_F$ from the image stack 34. The coordinate $z_F$ may be considered as reference plane $z_F$ for further focusing operations. When a position $z_C$ of the average value of the degree-of-focus histogram $H_z$ is located higher than a position $z_{MAX}$ of a global maximum of the degree-of-focus histogram $H_z$, the position $z_C$ may be considered as $z_F$, otherwise the position $z_F$ may correspond to the position $Z_{MAX}$ (see FIG. 7, 8):

$$z_F = \begin{cases} \text{int}(z_C + k_Z \cdot (z_C - z_{MAX})), & z_C > z_{MAX} \\ z_{MAX}, & z_C \leq z_{MAX} \end{cases}$$

where $k_Z$ is a coefficient in range form 0 to 2.5; $z_F$, $z_C$, $z_{MAX}$ are the position (coordinate) of best focus, the coordinate of geometrical center of degree-of-focus histogram $H_z$, and the coordinate of global maximum of the degree-of-focus histogram $H_z$, relatively:

$$z_C = \frac{1}{M} \cdot \sum_{z=0}^{M-1} H_z$$

$$z_{MAX} : H(z_{MAX}) = \max_{z \in [0, M-1]}(H(z))$$

with M as the number of images in image stack 34.

To guarantee presence of focused images of buses 108 or vias 110 in image stack 34 the position of the best-focused image $z_F$ may be smaller than M−1 on the value $\Delta M$ that may correspond to a height of a bus 108 or of a via 110:

$$z_F = \begin{cases} z_F, & (M - 1 - z_F) > \Delta M \\ z_F + \Delta M, & (M - 1 - z_F) \leq \Delta M \end{cases}$$

$\Delta M$ is the number of images $U_z$ in the image stack 34 that corresponds to a height $\Delta Z_{vc}$ of buses 108 or vias (contacts) 110:

$$\Delta M = \text{int}\left(\frac{Z_{VC}}{\Delta Z_S}\right) + k_M \approx \text{int}\left(\frac{\Delta Z + \Delta Z_{IL}}{\Delta Z_S}\right) + k_M$$

$\Delta Z_S$ is a distance between the planes (images) of image stack 34 in an object space of the optical microscope 18; $k_M$ is an integer constant in the range from 0 to 16 that provides reliable capturing of buses 108 and vias 110. The plane-of-best-focus selection module 48 may comprise logic for selecting a position-of-best-focus $z_F$ by taking into account a degree-of-focus histogram $H_z$ determined by the degree-of-focus determination module 90. As an alternative, or in addition, the position-of-best-focus selection module 48 may comprise logic for selecting a position of best-focus $z_F$ by taking into account a third dimension (one of $\Delta Z$, $\Delta ZL$, and $\Delta Z+\Delta ZL$) of a topological element 56 of the structure 30 to be imaged.

In a sixth method step 260, when the best-focused image $z_F$ is close to the highest image M−1, the method steps one to six are repeated to guarantee that images of buses 108 and vias or contacts 110 will be present in the image stack 34.

In a seventh method step 270, information about the position of best-of-focus image is used for further building a digital map of the object surface 32. It may be performed by the scanning control module 52 which may send commands to the controller 28 of motorized focus driver 26 to send a focus position as $z_F$ and to the controller 24 of the motorized stages 22 to move to the next position for building the next image stack 106.

Figure 9:
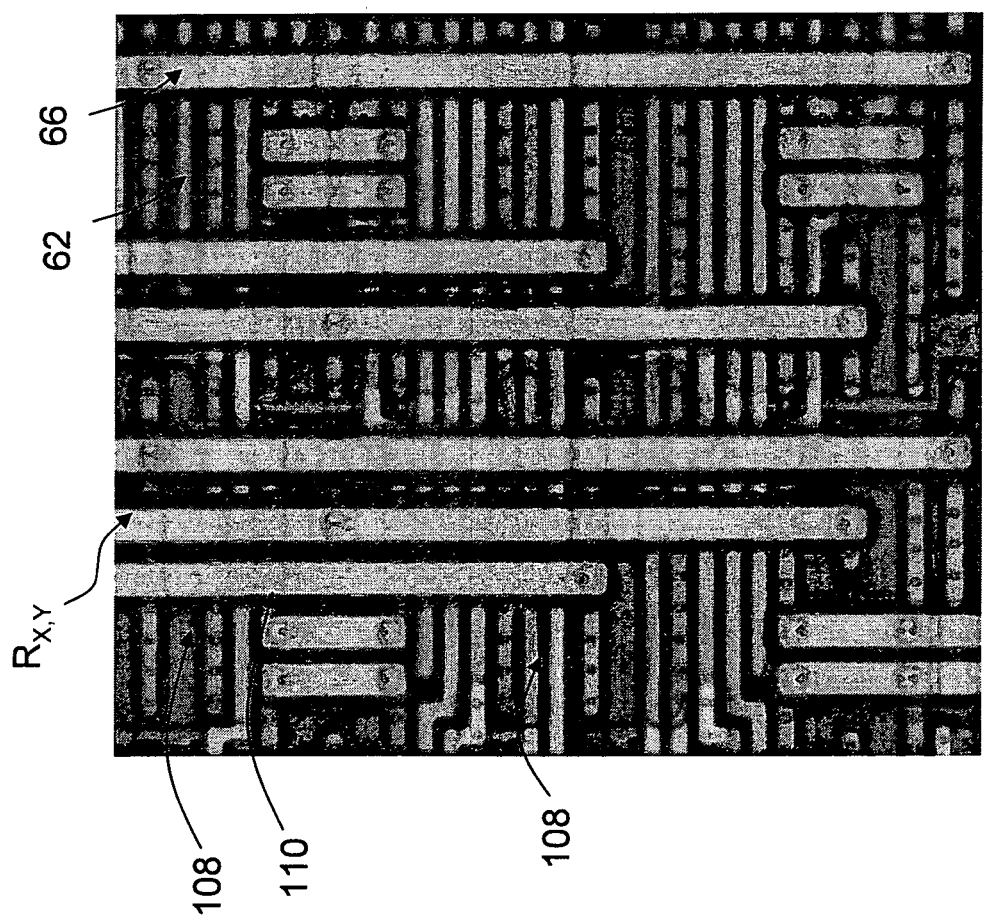
FIG. 9 shows an image with digital focus extension taken with adaptation of the digital focus extension to die features, according to an example of an embodiment of the invention.

FIG. 9 shows an image $R_{X,Y}$ taken with adaptation of the digital focus extension to die features $x_{MIN}$, $y_{MIN}$.

The present invention may provide at least some of the following benefits: a location of an upper layer $L_U$ can be predicted even when the upper layer $L_U$ has not been seen by a conventional automatic imaging system. The observation of buses 108 and high vias or contacts 110 can be reliable, even when their number is very small. The image processing module 14 can distinguish the upper layer $L_U$ from the one which is lower automatically. The described automatic focusing to multi-layer structures can be reliable for such inspection platforms and microscopes that work in at least one of the deep ultraviolet, ultraviolet, visible, and infrared ranges. Advantages of the invention may be for example: high reliability of the proposed focusing method due to adaptation to feature dimensions $x_{MIN}$, $y_{MIN}$ and dielectric interlayer thickness $\Delta_{ZIL}$, better image quality of the digital focus extension (see FIG. 3, 9). Using the reliable focusing algorithm according to the invention the production of a very large number of image stacks 34 can be made fully automatic. This may be in particular useful for implementation of fully automatic imaging systems in industry inspection. The possible applications of the proposed method may be production of digital maps in microelectronics, material, biological and medical science.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time-multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. An imaging system, configured to image a structure of an object, the object comprising a plurality of buses or vias or contacts, wherein the buses respectively have at least one prevailing orientation OX, the imaging system comprising:
   a stage upon which the object having the structure comprising a plurality of topological elements is to be mounted;
   a motorized focus driver for driving the stage;
   optics, wherein the imaging system is for:
      positioning the object such that the prevailing orientation OX is perpendicular to a scanning direction OY; and
      producing an image stack comprising a set of images, each image made with a different coordinate along an optical axis; and an image processing module configured to process a set of electronic images, the image processing module comprising a degree-of-focus determination module for taking into account at least one of a first and a second dimension of a topological element of the structure to be imaged, the degree-of-focus determination module for controlling the motorized focus driver, wherein the image processing module filters the images of the set of images using a filter matrix, the filter matrix calculated using dimensions of topological elements of the structure, wherein the structure comprises a plurality of topological elements; and wherein the degree-of-focus determination module further performs the steps of:

determining a position of best focus along the optical axis;

determining a position of focus to guarantee focused images of the buses or vias;

if the position of best focus lies below or at the position of focus to guarantee focused images, selecting the position of best focus as a focus position; and if the position of best focus lies above the position of focus to guarantee focused images, selecting the position of focus to guarantee focused images as the focus position.

2. The imaging system of claim 1 wherein the degree-of-focus determination module comprises a filter having a first filter parameter adapted to the first dimension of the topological element of the structure to be imaged.

3. The imaging system of claim 2 wherein the filter has a second filter parameter adapted to the second dimension of the topological element of the structure to be imaged and wherein the filter is represented by a two-dimensional array, wherein a dimension of the filter is based upon a minimum value of the first dimension and the second dimension of the topological element.

4. The imaging system of claim 3 wherein a first direction of the first dimension and a second direction of the second dimension are substantially perpendicular to each other.

5. The imaging system of claim 1 wherein the image processing module further comprises:

a position-of-best-focus selection module for selecting a position of position of best focus by taking into account a degree-of-focus histogram $H_z$ determined by the degree-of-focus determination module, wherein $H_z$ is a number of pixels with highest degree-of-focus at a distance z along an optical axis of the optics.

6. The imaging system of claim 1 wherein the image processing module further comprises:

a position-of-best-focus selection module for selecting a position of best focus by taking into account a third dimension of the topological element of the structure to be imaged.

7. The imaging system of claim 6, wherein the third dimension of the topological element is one of a thickness of a layer, a thickness of an interlayer, and a sum of both thicknesses, wherein the structure comprises a plurality of layers.

8. The imaging system of claim 1 wherein the image processing module further comprises:

a camera; and a memory for storing images.

9. The imaging system of claim 1, wherein the illumination system is capable to illuminate the object surface in bright field or in dark field.

10. The imaging system of claim 1, wherein the illumination system is capable to illuminate the object surface for observation of the object in transmitted light or in reflected light.

11. The imaging system of claim 1, wherein the illumination system is capable to illuminate the object surface for observation of the fluorescence of the object.

12. The imaging system of claim 1 wherein the object comprises a die.

13. The imaging system of claim 12 wherein:

the die comprises a plurality of layers; and the topological element lies within one of the plurality of layers.

14. A method for determining a degree-of-focus for imaging a structure of an object, wherein the structure comprises a plurality of buses or vias or contacts, wherein the buses respectively have at least one prevailing orientation OX, the method comprising:

positioning the object such that the prevailing orientation OX is perpendicular to a scanning direction OY;

producing an image stack comprising a set of images, each image made with a different among along an optical axis;

filtering the images of the set of images using a filter matrix, the filter matrix calculated using dimensions of topological elements of the structure, wherein the structure comprises a plurality of topological elements;

determining a position of best focus along the optical axis;

determining a geometric center of the image stack;

if the position of best focus lies above the geometric center, selecting the position of best focus as a focus position; and if the position of best focus lies below the geometric center, selecting a position above the geometric center as the focus position.

15. The method of claim 14 further comprising composing an image with focus extension comprising:

for each two dimensional pixel position x, y, selecting a value z along the optical axis such that a pixel $S_{x,y,z}$ has a best focus; and assembling the selected pixels $S_{x,y,z}$ into an image.

16. A non-transitory computer-readable storage medium storing instructions executable by a processor, wherein the instructions when executed by the processor determine a degree-of-focus for imaging a structure of an object, wherein the structure comprises a plurality of buses or vias or contacts, wherein the buses respectively have at least one prevailing orientation OX, the instructions comprising:

instructions to position the obiect such that the prevailing orientation OX is perpendicular to a scanning direction OY;

instructions to produce an image stack comprising a set of images, each image made with a different coordinate along an optical axis;

instructions to filter the images of the set of images using a filter matrix, the filter matrix calculated using dimensions of topological elements of the structure, wherein the structure comprises a plurality of topological elements;

instructions to determine a position of best focus along the optical axis;

instructions to determine a geometric center of the image stack;

instructions to select the position of best focus as a focus position if the position of best focus lies above the geometric center; and instructions to select a position above the geometric center as the focus position if the position of best focus lies below the geometric center.

17. The computer-readable storage medium of claim 16, wherein the instructions further take into account a third dimension of the topological element of the structure to be imaged.

18. The computer-readable storage medium of claim 17, wherein the third dimension of the topological element is one of a thickness of a layer, a thickness of an interlayer, and a sum of the layer and the interlayer.

* * * * *